(12) United States Patent
Kim et al.

(10) Patent No.: US 11,955,629 B2
(45) Date of Patent: Apr. 9, 2024

(54) POSITIVE ELECTRODE ACTIVE MATERIAL FOR LITHIUM SECONDARY BATTERY, AND POSITIVE ELECTRODE COMPRISING SAME

(71) Applicant: LG Chem, Ltd., Seoul (KR)

(72) Inventors: Jong Pil Kim, Daejeon (KR); Seung Beom Cho, Daejeon (KR); Won Tae Kim, Daejeon (KR); San Su Son, Daejeon (KR); Hyuck Lee, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 15/757,589

(22) PCT Filed: Mar. 31, 2017

(86) PCT No.: PCT/KR2017/003542
§ 371 (c)(1),
(2) Date: Mar. 5, 2018

(87) PCT Pub. No.: WO2017/171463
PCT Pub. Date: Oct. 5, 2017

(65) Prior Publication Data
US 2019/0027748 A1  Jan. 24, 2019

(30) Foreign Application Priority Data

Mar. 31, 2016 (KR) .......................... 10-2016-0039391
Mar. 30, 2017 (KR) .......................... 10-2017-0040482

(51) Int. Cl.
*H01M 4/505* (2010.01)
*C01G 53/00* (2006.01)
*H01M 4/02* (2006.01)
*H01M 4/04* (2006.01)
*H01M 4/131* (2010.01)
*H01M 4/525* (2010.01)
*H01M 10/052* (2010.01)
*H01M 10/0525* (2010.01)

(52) U.S. Cl.
CPC ............ *H01M 4/505* (2013.01); *C01G 53/50* (2013.01); *H01M 4/0471* (2013.01); *H01M 4/131* (2013.01); *H01M 4/525* (2013.01); *H01M 10/052* (2013.01); *H01M 10/0525* (2013.01); *C01P 2002/74* (2013.01); *C01P 2002/76* (2013.01); *C01P 2002/78* (2013.01); *H01M 2004/021* (2013.01); *H01M 2004/028* (2013.01)

(58) Field of Classification Search
None
See application file for complete search history.

(56) References Cited

U.S. PATENT DOCUMENTS

| 2008/0268347 | A1 | 10/2008 | Ohzuku et al. | |
| 2010/0143791 | A1* | 6/2010 | Park | H01M 4/131 |
| | | | | 429/220 |
| 2013/0177816 | A1* | 7/2013 | Chang | C01G 53/50 |
| | | | | 429/231.95 |
| 2014/0234704 | A1* | 8/2014 | Kamizori | H01M 10/052 |
| | | | | 429/200 |
| 2014/0342246 | A1 | 11/2014 | Kim | |
| 2015/0010819 | A1* | 1/2015 | Lee | H01M 4/505 |
| | | | | 429/223 |
| 2016/0380263 | A1 | 12/2016 | Nakayama et al. | |
| 2017/0077514 | A1 | 3/2017 | Cho et al. | |

FOREIGN PATENT DOCUMENTS

| EP | 2804242 A1 | 11/2014 | |
| EP | 3101716 A1 | 12/2016 | |
| KR | 20090080939 A | 7/2009 | |
| KR | 10-2011-0061204 A | 6/2011 | |
| KR | 10-2012-0030013 A | 3/2012 | |
| KR | 10-2014-0134592 A | 11/2014 | |
| KR | 10-2015-0104675 A | 9/2015 | |
| KR | 10-2016-0026307 A | 3/2016 | |
| KR | 20160026307 A * | 3/2016 | ............. H01M 4/36 |
| WO | 2015111740 A1 | 7/2015 | |

OTHER PUBLICATIONS

Sun et al. "Control of electrochemical properties of nickel-rich layered cathode materials for lithium ion batteries by variation of the manganese to cobalt ratio" Journal Of Power Sources 275 (2015) pp. 877-883.
International Search Report dated Jul. 10, 2017, from PCT/KR2017/003542, 2 pages.
Extended European Search Report including Written Opinion for Application No. EP17775886.9 dated Jun. 4, 2018.
Tran N et al., "Layered Li1+x(Ni0.425Mn0.425Co0. 15)1-xO2 Positive Electrode materials for lithium batteries", Journal of the Electrochemical Society, Electrochemical Society, Inc., Dec. 23, 2006, vol. 153, No. 2, pp. A261-A269, XP003024845.

* cited by examiner

*Primary Examiner* — Pamela H Weiss
*Assistant Examiner* — Amanda Rosenbaum
(74) *Attorney, Agent, or Firm* — Lerner David LLP

(57) ABSTRACT

The present invention relates to a positive electrode active material having improved capacity characteristic and life cycle characteristic, and a method of preparing the same, and specifically, to a positive electrode active material for a lithium secondary battery, wherein the positive electrode active material comprises a compound represented by Formula 1 above and allowing reversible intercalation/deintercalation of lithium, and from a crystal structure analysis of the positive electrode active material by a Rietveld method in which space group R-3m is used in a crystal structure model on the basis of an X-ray diffraction analysis, the thickness of MO slab is 2.1275 Å or less, the thickness of inter slab is 2.59 Å or greater, and the cation mixing ratio between Li and Ni is 0.5% or less, and a method of preparing the same.

6 Claims, No Drawings

POSITIVE ELECTRODE ACTIVE MATERIAL FOR LITHIUM SECONDARY BATTERY, AND POSITIVE ELECTRODE COMPRISING SAME

TECHNICAL FIELD

Cross-Reference to Related Applications

The present application is a national phase entry under 35 U.S.C. § 371 of International Application No. PCT/KR2017/003542, filed Mar. 31, 2017, published in Korean, which claims priority from Korean Patent Application Nos. 10-2016-0039391, filed on Mar. 31, 2016, and 10-2017-0040482, filed on Mar. 30, 2017, in the Korean Intellectual Property Office, all of which are incorporated herein by reference.

TECHNICAL FIELD

The present invention relates to a positive electrode active material having improved capacity characteristic and life cycle characteristic, and a positive electrode comprising the same.

BACKGROUND ART

Recently, in relation to the trend of size reduction and weight reduction in mobile devices and the like, demand for secondary batteries as an energy source for these devices has been rapidly increased. Among these secondary batteries, a lithium secondary battery having high energy density and voltage, long life cycle, and low self-discharge rate has been commercialized and widely used.

Also, in line with growing concerns about environmental issues, a significant amount of research on environment-friendly electric vehicles which may replace vehicles using fossil fuels, such as gasoline vehicles and diesel vehicles, one of major causes of air pollution, has been conducted. As a power source for these electric vehicles, there is a need for the development of a lithium secondary battery having high energy density, stable driving thereof at a high voltage, and excellent life cycle.

Recently, studies of the use of a three-component layered oxide of Ni, Mn, and Co as such a positive electrode active material for a lithium secondary battery have been steadily conducted.

Li[$Ni_{1/3}Co_{1/3}Mn_{1/3}$]$O_2$ (NCM), which is the most representative material among the three-component layered oxides, changes from $Ni^{2+}$ to $Ni^{3+}$ or $Ni^{4+}$ depending on a charging depth when charging. However, unlike $Ni^{2+}$, which is stable, $Ni^{3+}$ or $Ni^{4+}$ is reduced to $Ni^{2+}$ because of sudden oxygen decalation occurring due to instability. The decalated oxygen then reacts with an electrolyte to change the surface property of an electrode, or to increase the charge transfer impedance of the surface thereby causing problems of deteriorating capacity or high-rate characteristics, and the like, and thus lowering the energy density.

To solve such problems, $Li_x[Ni_{1-y-z}Co_yAl_z]O_2$ (0.96≤x≤1.05, 0≤y≤0.2, 0≤z≤0.1) (hereinafter NCA), which is $LiNi_xCo_{1-x}O_2$ additionally doped with a small amount of stable Group 13 metals, such as B, Al, In, and Ti, and the like are proposed.

Since a stable trivalent metal ion such as Al is moved or dispersed between the layers of $NiO_2$ during charging and discharging and stabilizes structure of hexagonal, the NCA is known to have high stability, and the highest capacity among positive electrode active materials for a lithium secondary battery available in the market today.

However, as the amount of Ni increases, the stability of all of these positive electrode active materials is hindered and thus the life cycle thereof is lowered.

DISCLOSURE OF THE INVENTION

Technical Problem

An aspect of the present invention provides a positive electrode active material having improved capacity and life cycle characteristics by adjusting the amount of cobalt and manganese in a three-component positive electrode active material having a high content of nickel.

Another aspect of the present invention provides a method of preparing the positive electrode active material of the present invention.

Another aspect of the present invention provides a positive electrode for a lithium secondary battery, the positive electrode comprising the positive electrode active material of the present invention.

Another aspect of the present invention is to provide a lithium secondary battery comprising the positive electrode of the present invention.

Technical Solution

According to an aspect of the present invention, there is provided a positive electrode active material for a lithium secondary battery, the positive electrode active material comprising a compound represented by Formula 1 below and allowing reversible intercalation/deintercalation of lithium, wherein from a crystal structure analysis of the positive electrode active material by a Rietveld method in which space group R-3m is used in a crystal structure model on the basis of an X-ray diffraction analysis, the thickness of MO slab is 2.1275 Å or less, the thickness of inter slab is 2.59 Å or greater, and the cation mixing ratio between Li and Ni is 0.5% or less.

$Li_x[Ni_{a1}Co_{b1}Mn_{c1}]O_2$     [Formula 1]

In Formula 1 above, 1.0≤x≤1.2, 0.85≤a1≤0.99, 0<b1<0.15, 0<c1<0.15, and a1+b1+c1=1.

Another aspect of the present invention, there is provided a method of preparing a positive electrode active material for a lithium secondary battery comprising: (Step 1) preparing a mixture by mixing a transition metal precursor represented by Formula 2 below and a lithium precursor such that the ratio of the number of moles of lithium present in the lithium precursor based on the total number of moles of transition metal present in the transition metal precursor (the number of moles of Li/the total number of moles of transition metal) is 1.03 or greater; and (Step 2) sintering the mixture at a temperature of 800° C. to 850° C. to form a compound represented by Formula 1 above and allowing reversible lithium intercalation/deintercalation.

$[Ni_{a2}Co_{b2}Mn_{c2}](OH)_2$     [Formula 2]

In Formula 2 above, 0.85≤a2≤0.99, 0<b2<0.15, 0<c2<0.15, and a2+b2+c2=1.

Another aspect of the present invention, there is provided a positive electrode comprising the positive electrode active material.

Another aspect of the present invention, there is provided a lithium secondary battery comprising the positive electrode, a negative electrode having a negative electrode active material; a separator interposed between the positive electrode and the negative electrode, and an electrolyte.

Advantageous Effects

According to an embodiment of the present invention, provided are a positive electrode active material for a lithium secondary battery, the positive electrode active material having improved capacity and life cycle characteristics, a method of preparing the same, a positive electrode comprising the same, and a lithium secondary battery comprising the positive electrode.

MODE FOR CARRYING OUT THE INVENTION

Hereinafter, the present invention will be described in more detail.

It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

A positive electrode active material for a lithium secondary battery according to an embodiment of the present invention may be a positive electrode active material for a lithium secondary battery, the positive electrode active material comprising a compound represented by Formula 1 below and allowing reversible intercalation/deintercalation of lithium.

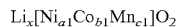    [Formula 1]

In Formula 1 above, $1.0 \leq x \leq 0.2$, $0.85 \leq a1 \leq 0.99$, $0 < b1 < 0.15$, $0 < c1 < 0.15$, and $a1+b1+c1=1$.

In the compound represented by Formula 1 above, Li may be comprised in an amount corresponding to x, that is, $1.0 \leq x \leq 1.2$, specifically, $1.01 \leq x \leq 1.04$. If the above mentioned range is satisfied, it is possible to improve the capacity and life cycle characteristics of positive electrode active material by controlling the amount of Li, and to balance sinterability when preparing an active material. If x is less than the above mentioned range, the capacity characteristic of a positive electrode active material may be deteriorated. If x is greater than the above mentioned range, the life cycle characteristic of a positive electrode active material may be deteriorated due to an excessive growth of crystal grains during the sintering process of the positive electrode active material.

In the compound represented by Formula 1 above, Ni may be comprised in an amount corresponding to a1, that is, $0.85 \leq a1 \leq 0.99$, specifically, $0.86 \leq a1 \leq 0.90$. If the above mentioned range is satisfied, it is possible to realize a better capacity characteristic, and high temperature stability.

In the compound represented by Formula 1 above, Co may be comprised in an amount corresponding to b1, that is, $0 < b1 < 0.15$, specifically, $0.06 \leq b1 \leq 0.10$. If the above mentioned range is satisfied, it is possible to improve the capacity characteristic of a positive electrode active material. If b1 is 0, the capacity characteristic of a positive electrode active material may be deteriorated. If b1 is greater than the above mentioned range, the effect of increasing the amount of Co may be insignificant.

Also, in the compound represented by Formula 1 above, Mn may be comprised in an amount corresponding to c1, that is, $0 < c1 < 0.15$, specifically, $0.02 \leq c1 \leq 0.06$. If the above mentioned range is satisfied, the capacity characteristic and the structure stability of a positive electrode active material may be improved, so that a secondary battery, which is the final product, may realize the high capacity and the improved output characteristic. If c1 is 0, the effect of having Mn may not be obtained. If c1 is greater than the above mentioned range, the output characteristic and the capacity characteristic of a secondary battery, which is the final product, may be deteriorated.

From a crystal structure analysis of the positive electrode active material by a Rietveld method in which space group R-3m is used in a crystal structure model on the basis of an X-ray diffraction analysis, the thickness of MO slab may be 2.1275 Å or less, the thickness of inter slab may be 2.59 Å or greater, and the cation mixing ratio between Li and Ni may be 0.5% or less. More specifically, the positive electrode active material having a crystal lattice controlled may improve the battery characteristic of a lithium secondary battery. Further particularly, according to an embodiment of the present invention, a positive electrode active material having a crystal lattice controlled by adjusting the amount of cobalt and manganese according to the above mentioned range may realize more improved characteristics in terms of capacity and life cycle than a positive electrode active material having a crystal lattice not controlled.

If one of the composition of positive electrode active material, the thickness of MO slab, the thickness of inter slab, and the cation mixing ratio of Li and Ni does not satisfy the above mentioned ranges, the capacity characteristic and the life cycle characteristic of a lithium secondary battery, which is the final product, may not all be excellent.

The MO slab represents the thickness of a transition metal layer in an octahedral crystal structure, and the inter slab represents the thickness of a lithium layer in an octahedral crystal structure.

When the MO slab is 2.1275 Å or less, since the distance between the transition metal and oxygen is close and kept compact, it means that the deterioration due to a structural change occurring during charging and discharging is small. The thickness of the MO slab may be 2.1260 Å to 2.1275 Å.

Also, when the inter slab is 2.59 Å or greater, since the distance between the lithium and oxygen is sufficient, it means that the intercalation and deintercalation of lithium is easy. The thickness of the inter slab may be 2.59 Å to 2.615 Å, specifically, 2.605 Å to 2.615 Å

In addition, the ratio of inter slab/MO slab, which is the ratio of the MO slab and the inter slab, may be 1.2 to 1.25, specifically, 1.217 to 1.23.

As described above, in the case of the positive electrode active material of the present invention, the interaction of metal ions in a MO6 octahedral crystal structure is expected to be reduced due to the decrease in the thickness of the MO slab. The positive electrode active material having a crystal lattice controlled due to the increase in the thickness of the inter slab may exhibit improved effects in terms of reversible migration and electric conductivity of a Li ion.

The positive electrode active material of the present invention may have a crystal lattice controlled under the influences of the mole ratio of each element in the transition metal, the mixing molar ratio of lithium and the transition metal, a sintering temperature, and the like. According to the specific processing conditions, a lattice parameter, an MO slab, and an inter slab thickness may be available, and due to such structural characteristics, a positive electrode active material having excellent electrochemical characteristics, such as high capacity and high life cycle, may be provided.

The positive electrode active material of the present invention may have a cation mixing of Li and Ni of 0.5% or less, specifically of 0.3% to 0.4%. Here, the cation mixing of Li and Ni refers to an amount of Ni cations present in a lithium layer. That is, in a crystal of lithium nickel-cobalt-manganese-based oxide, there is a site in which Li and Ni should be respectively located. However, since the ionic radii of Li cation and Ni cation are similar to each other, some of the Ni cations move to the site of Ni cations, and Ni cations of the same amount of Li cations positioned in the site of Ni cations move to the site of Li cations in the heat treatment, the whole process of which is called cation mixing.

As the amount of the cation mixing increases, the movement of Li ions during the electrochemical reaction is disturbed, which means that the electrochemical performance, that is, the capacity characteristic, is deteriorated. In the present invention, the amount of cation mixing is minimized by controlling the composition ratio of the transition metals constituting the positive electrode active material, and the sintering temperature during the preparation of the positive electrode active material, thereby helping reversible movement of lithium ions.

From a crystal structure analysis of the positive electrode active material by a Rietveld method in which space group R-3m is used in a crystal structure model on the basis of an X-ray diffraction analysis, an a-axis may be 2.87 to 2.88, a c-axis may be 14.19 to 14.20, a size of one crystal in the crystal lattice may be 101.47 Å$^3$ to 101.48 Å$^3$, and a Z may be 0.24 to 0.242.

The a-axis may specifically be 2.872 to 2.874. The c-axis may specifically be 14.194 to 14.197. The ratio of the a-axis to the-c axis (c/a) may be 4.927 to 4.948, specifically, 4.938 to 4.943. If the above mentioned ranges are satisfied, it means that the transition metal in the positive electrode active material is stably positioned in a two dimensional structure of the space group R-3m on the basis of an X-ray diffraction analysis such that a hexagonal structure is stably developed.

The size of one crystal in the crystal lattice of the positive electrode active material may specifically be 101.475 Å$^3$ to 101.478 Å$^3$.

The Z of the positive electrode active material is an index indicating the position of oxygen in the positive electrode active material. Based on a Z value, the distance between lithium and oxygen, and the distance between the transition metal and oxygen may be measured. The Z of the positive electrode active material may specifically be 0.2414 to 0.2417.

I (003/104) of the positive electrode active material is an index indicating the crystallinity of the positive electrode active material. The larger the number value is among positive electrode active materials having the same composition, the more stably the hexagonal structure thereof is developed. The I (003/104) of the positive electrode active material may be 2.0 to 2.2, specifically, 2.05 to 2.15.

I (006+102)/(101) of the positive electrode active material is an index indicating whether the positive electrode active material has been properly sintered. The smaller the number value is among the positive electrode active material having the same composition, the more stably the hexagonal structure thereof is developed. The I (006+102)/(101) of the positive electrode active material may be 0.75 to 0.79, specifically, 0.76 to 0.78.

The I (003/104) and the I (006+102)/(101) of the positive electrode active material may be measured through an X-ray diffraction analysis. The specific measurement conditions may be that the velocity is 0.02° min$^{-1}$, the diffraction angle (2θ) is 10° to 90°, and the light source is Fe-Kα ray (λ=1.936 Å).

A method of preparing a positive electrode active material for a lithium secondary battery according to another embodiment of the present invention may comprise: preparing a mixture by mixing a transition metal precursor represented by Formula 2 below and a lithium precursor such that the ratio of the number of moles of lithium present in the lithium precursor based on the total number of moles of transition metal present in the transition metal precursor (number of moles of Li/the total number of moles of transition metal) is 1.03 or greater; and sintering the mixture at a temperature of 800° C. to 850° C. to form a compound represented by Formula 1 above and allowing reversible intercalation/deintercalation of lithium.

  [Formula 2]

In Formula 2 above, 0.85≤a2≤0.99, 0<b2<0.15, 0<c2<0.15, and a2+b2+c2=1.

The descriptions of the a2, b2, and c2 are the same as the descriptions of the a1, b1, and c2 of the compound represented by Formula 1 above.

The transition metal precursor may be directly prepared and used, or one available in the market today therefor may be purchased and used.

When preparing the transition metal precursor directly, the transition metal precursor may be prepared by a method comprising, preparing a metal aqueous solution by using nickel sulfate, cobalt sulfate, and manganese sulfate as solutes, and using distilled water as a solvent, wherein nickel, cobalt, and manganese in a metal aqueous solution satisfy the mole ratio of nickel, cobalt, and manganese described in Formula 2 above; and while maintaining the pH of a reactor at 11 to 12, adding a precipitating agent and a chelating agent to the metal aqueous solution and mixing them.

In this case, the precipitating agent may be sodium hydroxide.

Also, the chelating agent for eluting cations of the transition metal may be ammonia water.

An average particle diameter of the transition metal precursor prepared by the method of the present invention may preferably be 5 μm to 20 μm.

The lithium precursor may comprised one or more selected from the group consisting of Li$_2$CO$_3$, LiOH, LiOH·H$_2$O, Li$_2$O, and Li$_2$O$_2$.

When mixing the transition metal precursor and the lithium precursor in Step 1, the ratio of the number of moles of lithium present in the lithium precursor based on the total number of moles of transition metal present in the transition metal precursor (number of moles of Li/the total number of moles of transition metal) may be 1.03 or greater, specifically, 1.03 to 1.04. When the ratio is greater than the above mentioned range, the amount of cation mixing may increase due to an excessive growth of crystal grains in the sintering process of positive electrode active material such that the electrochemical characteristic thereof may be degraded.

The sintering temperature may specifically be 800° C. to 820° C. When the sintering temperature is less than 800° C., or greater than 850° C., the cation mixing ratio of Li and Ni increases, and the values of MO slab and inter slab and the ratio of the a-axis to the c-axis (c/a) change such that the battery characteristic at room temperature and high temperature is rapidly deteriorated showing low electrochemical characteristics of deteriorated capacity and life cycle characteristics.

The method of preparing a positive electrode active material according to another embodiment of the present invention may further comprise heat treating the mixture at a temperature of 500° C. to 600° C. before performing Step 2. When the heat treatment is performed, the lithium precursor is decomposed and converted into a state in which the decomposed lithium precursor may react with the transition metal precursor easily.

In addition, an embodiment of the present invention provides a lithium secondary battery comprising a positive electrode having the positive electrode active material of the present invention, a negative electrode having a negative electrode active material; a separator interposed between the positive electrode and the negative electrode, and an electrolyte.

In this case, the positive electrode active material of the present invention may further comprise a binder, and in some cases, may further comprise a conducting agent.

The binder serves to bind particles of a positive electrode active material to each other, and also to bind the positive electrode active material to a current collector. Representative examples thereof may comprise polyvinyl alcohol, carboxymethylcellulose, hydroxypropylcellulose, diacetylcellulose, polyvinyl chloride, carboxylated polyvinyl chloride, polyvinyl fluoride, polymers containing ethylene oxide, polyvinylpyrrolidone, polyurethane, polytetrafluoroethylene, polyvinylidene fluoride, polyethylene, polypropylene, styrene-butadiene rubber, acrylated styrene-butadiene rubber, epoxy resin, nylon, and the like, but are not limited thereto.

Also, the conducting agent is used for imparting conductivity to an electrode. When configuring a battery, any material may be used without limit as long as the material is an electronic conducting agent, and does not cause chemical changes. Specific examples conducting agents may comprise carbon-based materials such as natural graphite, synthetic graphite, carbon black, acetylene black, Ketjen black, and a carbon fiber; metal powders such as copper, nickel, aluminum, and silver, or metal-based materials such as a metal fiber; conductive polymers such as a polyphenylene derivative; or a mixture thereof.

In addition, the negative electrode active material may comprise lithium metal, an alloy of lithium metal, a material allowing reversible intercalation/deintercalation of lithium ions, a material capable of doping and dedoping lithium, or a transition metal oxide Specifically, the material allowing reversible intercalation/deintercalation of lithium ions is a carbon material, and any carbon-based negative electrode active material typically used in a lithium secondary battery may be used. Representative examples thereof may comprise crystal carbon, amorphous carbon, or a combination thereof. Examples of the crystal carbon may comprise graphite such as natural graphite or artificial graphite in an amorphous, plate-like, flake, spherical or fiber form. Examples of the amorphous carbon may comprise soft carbon (low temperature sintered carbon) or hard carbon, mesophase pitch carbide, sintered coke, and the like.

In addition, the material capable of doping and dedoping lithium may comprise Si, SiOx (0<x<2), an Si—Y alloy (wherein the Y is an element selected from the group consisting of an alkali metal, an alkali earth metal, a Group 13 element, a Group 14 element, a transition metal, a rare earth element, and a combination thereof, not Si), Sn, SnO2, Sn—Y (wherein the Y is an element selected from the group consisting of an alkali metal, an alkaline earth metal, a Group 13 element, a Group 14 element, a transition metal, a rare earth element, and a combination thereof, not Sn), and the like, and a mixture of at least one thereof and $SiO_2$ may be used. The element Y may be selected from the group consisting of Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po, and a combination thereof.

In addition, the transition metal oxide may comprise a vanadium oxide, a lithium vanadium oxide, and the like.

The negative electrode active material may further comprise a binder and a conducting agent in some cases.

The binder serves to bind particles of negative electrode active material to each other, and also to bind the negative electrode active material to a current collector. Representative examples thereof may comprise polyvinyl alcohol, carboxymethylcellulose, hydroxypropylcellulose, polyvinyl chloride, carboxylated polyvinyl chloride, polyvinyl fluoride, polymers containing ethylene oxide, polyvinylpyrrolidone, polyurethane, polytetrafluoroethylene, polyvinylidene fluoride, polyethylene, polypropylene, styrene-butadiene rubber, acrylated styrene-butadiene rubber, epoxy resin, nylon, and the like, but are not limited thereto.

Also, the conducting agent is used for imparting conductivity to an electrode. When configuring a battery, any material may be used without limit as long as the material is an electronic conducting agent, and does not cause chemical changes. Specific examples conducting agents may comprise carbon-based materials such as natural graphite, synthetic graphite, carbon black, acetylene black, Ketjen black, and a carbon fiber; metal powders such as copper, nickel, aluminum, and silver, or metal-based materials such as a metal fiber; conductive polymers such as a polyphenylene derivative; or a mixture thereof.

The negative electrode and the positive electrode are prepared by mixing an active material, and in some cases, a conducting agent and a binder in a solvent to prepare an active material composition, and applying the composition to an electrode collector. This preparation method of an electrode is widely known in the art such that the detailed description thereof will be omitted.

Also, the electrolyte may comprise a non-aqueous organic solvent and a lithium salt.

The non-aqueous organic solvent serves as a medium through which ions involved in the electrochemical reaction of a battery may move.

The non-aqueous organic solvent may comprise a carbonate-based, ester-based, ether-based, ketone-based, alcohol-based, or aprotic solvent.

The carbonate-based solvent may comprise dimethyl carbonate (DMC), diethyl carbonate (DEC), dipropyl carbonate (DPC), methyl propyl carbonate (MPC), ethyl propyl carbonate (EPC), methyl ethyl carbonate (MEC), ethylene carbonate (EC), propylene carbonate PC), butylene carbonate (BC), and the like.

The ester-based solvent may comprise methyl acetate, ethyl acetate, n-propyl acetate, dimethylacetate, methyl propionate, ethyl propionate, gamma-butyrolactone, decanolide, valerolactone, mevalonolactone, caprolactone, and the like.

Also, the ether-based solvent may comprise dibutyl ether, tetraglyme, diglyme, dimethoxyethane, 2-methyltetrahydrofuran, tetrahydrofuran and the like may be used. As the ketone-based solvent, cyclohexanone, and the like.

The alcohol-based solvent may comprise ethyl alcohol, isopropyl alcohol, and the like. The aprotic solvent may comprise nitriles such as R—CN (R is a linear, branched, or cyclic hydrocarbon group having 2 to 20 carbon atoms, and may comprise a double bond aromatic ring or an ether bond), amides such as dimethylformamide, dioxolanes such as 1,3-dioxolane, sulfolanes, and the like.

The non-aqueous organic solvent may be used alone, or a mixture of one or more thereof may be used. If a mixture of one or more of the non-aqueous organic solvents is used, the mixing ratio may be appropriately adjusted according to the desired battery performance.

In addition, in the case of the carbonate-based solvent, it is preferable to use a mixture of a cyclic carbonate and a chain carbonate. In this case, when the cyclic carbonate and the chain carbonate are mixed in a volume ratio of 1:1 to 1:9, the performance of electrolyte may be excellent.

The non-aqueous organic solvent according to the present invention may comprise an aromatic hydrocarbon-based organic solvent to the carbonate-based solvent. In this case, the carbonate-based solvent and an aromatic hydrocarbon-based organic solvent may be mixed in a volume ratio of 1:1 to 30:1.

The non-aqueous electrolyte may further comprise vinylene carbonate or an ethylene carbonate-based compound to improve battery A lithium salt may comprise those commonly used in an electrolyte for a lithium secondary battery without limitation. For example, the lithium salt may comprise $Li^+$ as a positive ion, and at least one selected from the group consisting of $F^-$, $Cl^-$, $Br^-$, $I^-$, $NO_3^-$, $N(CN)_2^-$, $BF_4^-$, $ClO_4^-$, $AlO_4^-$, $AlCl_4^-$, $PF_6^-$, $SbF_6^-$, $AsF_6^-$, $BF_2C_2O_4^-$, $BC_4O_8^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $C_4F_9SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, and $(CF_3CF_2SO_2)_2N^-$ as a negative ion.

The lithium salt may be comprised in a concentration of 0.8 M to 1.6 M in a non-aqueous electrolyte such that the electrolyte may have appropriate conductivity and viscosity to exhibit excellent electrolyte performance and lithium ions may move efficiently.

In addition, in a lithium secondary battery of the present invention, the separator interposed between the positive electrode and the negative electrode may include polyethylene, polypropylene, polyvinylidene fluoride, or a multi-layered separator of two or more layers thereof, and a mixed multi-layered separator such as polyethylene/polypropylene two-layered separator, polyethylene/polypropylene/polyethylene three-layered separator, and polypropylene/polyethylene/polypropylene three-layered separator.

A lithium secondary battery may be classified into a lithium ion battery, a lithium ion polymer battery, and a lithium polymer battery according to the kinds of a separator and an electrolyte used; into a cylindrical battery, a rectangular battery, a coin type battery, a pouch type battery, and the like according to the shape thereof; into a bulk type battery and a thin film type battery according to the size thereof. The structures and the manufacturing methods of these batteries are widely known in the art such that the detailed descriptions thereof will be omitted.

Hereinafter, examples will be described in detail to particularly explain the present invention. The invention may, however, be embodied in many different forms and should not be construed as being limited to the examples set forth herein. Examples of the present invention are provided to more completely explain the present invention to a person with ordinary skill in the art.

EXAMPLES

Example 1, Example 2, Comparative Example 1 to Comparative Example 12

(Preparation of a Positive Electrode Active Material)

Transition metal precursors and lithium precursors disclosed in Table 1 below were added into an alumina crucible such that LiOH was ratios (Li/transition metal mole ratio) shown in Table 1 below, and dry mixed at 5,000 rpm for 10 minutes, and at 12,000 rpm for 15 minutes. The dry mixed powder was added into the alumina crucible and heat treated at 550° C. for 3 hours in an oxygen atmosphere. Thereafter, the heat treated powder was sintered at temperatures disclosed in Table 1 below for 10 hours in an oxygen atmosphere to prepare a lithium composite metal oxide. The lithium composite metal oxide was then pulverized, and the pulverized lithium composite metal oxide and distilled water were mixed at a weight ratio of 1:1, washed with water, filtered, dried at 130° C. for 20 hours, and classified to prepare a positive electrode active material.

TABLE 1

| Category | Transition metal precursor | Li/transition metal mole ratio | Sintering temperature (° C.) |
|---|---|---|---|
| Example 1 | $Ni_{0.88}Co_{0.08}Mn_{0.04}(OH)_2$ | 1.03 | 800 |
| Example 2 | $Ni_{0.88}Co_{0.08}Mn_{0.04}(OH)_2$ | 1.03 | 820 |
| Comparative Example 1 | $Ni_{0.88}Co_{0.08}Mn_{0.04}(OH)_2$ | 1.03 | 780 |
| Comparative Example 2 | $Ni_{0.88}Co_{0.04}Mn_{0.08}(OH)_2$ | 1.03 | 780 |
| Comparative Example 3 | $Ni_{0.85}Co_{0.10}Mn_{0.05}(OH)_2$ | 1.01 | 800 |
| Comparative Example 4 | $Ni_{0.85}Co_{0.10}Mn_{0.05}(OH)_2$ | 1.01 | 820 |
| Comparative Example 5 | $Ni_{0.85}Co_{0.10}Mn_{0.05}(OH)_2$ | 1.02 | 800 |
| Comparative Example 6 | $Ni_{0.85}Co_{0.05}Mn_{0.10}(OH)_2$ | 1.01 | 750 |
| Comparative Example 7 | $Ni_{0.85}Co_{0.05}Mn_{0.10}(OH)_2$ | 1.01 | 800 |
| Comparative Example 8 | $Ni_{0.60}Co_{0.20}Mn_{0.20}(OH)_2$ | 1.05 | 870 |
| Comparative Example 9 | $Ni_{0.60}Co_{0.20}Mn_{0.20}(OH)_2$ | 1.05 | 880 |
| Comparative Example 10 | $Ni_{0.60}Co_{0.20}Mn_{020}(OH)_2$ | 1.07 | 880 |
| Comparative Example 11 | $Ni_{0.80}Co_{0.10}Mn_{0.10}(OH)_2$ | 1.03 | 750 |
| Comparative Example 12 | $Ni_{0.80}Co_{0.10}Mn_{0.10}(OH)_2$ | 1.03 | 780 |

(Preparation of a Coin Half-Cell)

Positive electrode active materials each prepared in Example 1, Example 2, and Comparative Examples 1 to 12, carbon black as a conducting agent, and PVDF as a binder, N-methyl-2-pyrrolidone (NMP) as a solvent were mixed in a weight ratio of 95:2.5:2.5:5 to prepare a positive electrode slurry. An aluminum thin film having the thickness of 20 μm was coated with the positive electrode slurry, vacuum dried and roll pressed to prepare a positive electrode.

Lithium metal was used as a negative electrode.

A separator of porous polyethylene was disposed between the positive electrode and the negative electrode to prepare an electrode assembly and the electrode assembly was positioned inside a case. Thereafter, an electrolyte was added into the inside of the case to prepare a coin half-cell. At this time, the electrolyte was prepared by dissolving LiPF$_6$ in an organic solvent comprising ethylene carbonate/dimethyl carbonate (EC:DMC=1:1 vol %) to be 1.15M.

Experimental Examples

Experimental Example 1. X-Ray Diffraction Analysis

Mo slab, inter slab, cation mixing, crystal volume, a-axis, c-axis and Z were measured by performing a crystal structure analysis by a Rietveld method when using space group R-3m in a crystal structure model on the basis of an X-ray diffraction analysis to positive electrode active materials prepared in Example 1, Example 2, and Comparative Examples 1 to 12.

Then, I (003/104) and I (006+102)/(101) were measured by using an X-ray diffraction analyzer (manufacturer: BRUKER, product name: D8 ENDEAVOR) on the positive electrode active materials prepared in Example 1, Example 2, and Comparative Examples 1 to 12. The specific measurement conditions were as follows. The velocity was 0.02° min$^{-1}$. The diffraction angle (2θ) was 10° to 90°. The light source was Fe-Ka ray (λ=1.936 Å).

The results are shown in Table 2 and Table 3 below.

TABLE 2

| Category | MO slab (Å) | inter slab (Å) | inter slab/ Mo slab | Cation mixing (%) | volume (Å$^3$) |
|---|---|---|---|---|---|
| Example 1 | 2.1270 | 2.6051 | 1.2248 | 0.30 | 101.4777 |
| Example 2 | 2.1262 | 2.6054 | 1.2254 | 0.36 | 101.4761 |
| Comparative Example 1 | 2.1312 | 2.6007 | 1.2203 | 0.50 | 101.4687 |
| Comparative Example 2 | 2.1388 | 2.5963 | 1.2139 | 1.20 | 101.6030 |
| Comparative Example 3 | 2.1370 | 2.5959 | 1.2147 | 1.00 | 101.4869 |
| Comparative Example 4 | 2.1360 | 2.5985 | 1.2165 | 0.07 | 101.4660 |
| Comparative Example 5 | 2.1441 | 2.5900 | 1.2080 | 0.50 | 101.4874 |
| Comparative Example 6 | 2.1382 | 2.5955 | 1.2139 | 2.40 | 101.5437 |
| Comparative Example 7 | 2.1332 | 2.5995 | 1.2186 | 1.38 | 101.6129 |
| Comparative Example 8 | 2.1305 | 2.6113 | 1.2257 | 2.30 | 101.4387 |
| Comparative Example 9 | 2.1419 | 2.5994 | 1.2136 | 1.90 | 101.4167 |
| Comparative Example 10 | 2.1363 | 2.6052 | 1.2195 | 1.00 | 101.3393 |
| Comparative Example 11 | 2.1288 | 2.6067 | 1.2245 | 1.50 | 101.5788 |
| Comparative Example 12 | 2.1296 | 2.6070 | 1.2242 | 2.20 | 101.6804 |

TABLE 3

| Category | a | c | c/a | z | I (003/104) | I (006+102)/(101) |
|---|---|---|---|---|---|---|
| Example 1 | 2.8730 | 14.1963 | 4.9413 | 0.24158 | 2.1242 | 0.7720 |
| Example 2 | 2.8731 | 14.1949 | 4.9406 | 0.24156 | 2.0662 | 0.7652 |
| Comparative Example 1 | 2.8729 | 14.1957 | 4.9412 | 0.24173 | 2.0811 | 0.7871 |
| Comparative Example 2 | 2.8738 | 14.2053 | 4.9430 | 0.24195 | 2.0631 | 0.7773 |
| Comparative Example 3 | 2.8729 | 14.1987 | 4.9423 | 0.24192 | 2.3408 | 0.5870 |
| Comparative Example 4 | 2.8721 | 14.2036 | 4.9454 | 0.24186 | 2.4111 | 0.5542 |
| Comparative Example 5 | 2.8725 | 14.2023 | 4.9442 | 0.24215 | 2.4365 | 0.6214 |
| Comparative Example 6 | 2.8734 | 14.2010 | 4.9442 | 0.24195 | 2.2934 | 0.5901 |
| Comparative Example 7 | 2.8747 | 14.1982 | 4.9390 | 0.24179 | 2.3215 | 0.5754 |
| Comparative Example 8 | 2.8695 | 14.2255 | 4.9412 | 0.24155 | 2.5559 | 0.6200 |
| Comparative Example 9 | 2.8693 | 14.2239 | 4.9573 | 0.24196 | 2.5007 | 0.6320 |
| Comparative Example 10 | 2.8682 | 14.2244 | 4.9593 | 0.24176 | 2.6189 | 0.5833 |
| Comparative Example 11 | 2.8734 | 14.2065 | 4.9441 | 0.24159 | 2.5099 | 0.6233 |
| Comparative Example 12 | 2.8745 | 14.2097 | 4.9434 | 0.24160 | 2.4327 | 0.6409 |

Experimental Example 2. Evaluation of Battery Characteristic (1)

The coin half-cells prepared in Example 1, Example 2, and Comparative Examples 1 to 12 were each charged at 25° C. until the voltage thereof reached 4.25V at a constant current (CC) of 0.2C. Thereafter, the coin half-cells were charged once at a constant voltage (CV) of 4.25V until the charging current thereof reached 1.0 mAh, and the charging capacity thereof were measured. After being left for 20 minutes, the coin half-cells were discharged once at a constant current of 0.2C until the voltage thereof reached 2.5V, and the discharging capacity thereof were measured. The results are shown in Table 4 below.

TABLE 4

| Category | Charging capacity (mAh/g) | Discharging capacity (mAh/g) | Charging-discharging efficiency (%) |
|---|---|---|---|
| Example 1 | 237.2 | 217.9 | 91.9 |
| Example 2 | 237.0 | 217.3 | 91.7 |
| Comparative Example 1 | 235.6 | 215.4 | 91.4 |
| Comparative Example 2 | 231.8 | 209.3 | 90.3 |
| Comparative Example 3 | 227.2 | 185.0 | 81.4 |
| Comparative Example 4 | 218.4 | 191.3 | 87.6 |
| Comparative Example 5 | 223.9 | 191.5 | 85.5 |
| Comparative Example 6 | 223.0 | 177.1 | 79.4 |
| Comparative Example 7 | 226.7 | 190.9 | 84.2 |
| Comparative Example 8 | 198.1 | 175.0 | 88.4 |
| Comparative Example 9 | 198.1 | 174.1 | 87.9 |
| Comparative Example 10 | 201.2 | 188.6 | 93.7 |
| Comparative Example 11 | 222.9 | 200.6 | 90.0 |

TABLE 4-continued

| Category | Charging capacity (mAh/g) | Discharging capacity (mAh/g) | Charging-discharging efficiency (%) |
|---|---|---|---|
| Comparative Example 12 | 221.4 | 201.2 | 90.8 |

Experimental Example 3. Evaluation of Battery Characteristic (2)

The coin half-cells prepared in Example 1, Example 2, and Comparative Examples 1 to 12 were each charged at 25° C. until the voltage thereof reached 4.25V at a constant current (CC) of 0.5C. Thereafter, the coin half-cells were charged once at a constant voltage (CV) of 4.25V until the charging current thereof reached 1.0 mAh, and the charging capacity thereof were measured. After being left for 20 minutes, the coin half-cells were discharged once at a constant current of 1C until the voltage thereof reached 2.5V, and the discharging capacity thereof were measured. This was referred to as one cycle, and 50 cycles were performed. Then, discharging capacity retention ratios (%), which is a ratio of discharging capacity according to the number of cycles to the discharging capacity of one cycle, were measured. The results are shown in Table 5 below.

TABLE 5

| Category | 5 times | 10 times | 20 times | 30 times | 40 times | 50 times |
|---|---|---|---|---|---|---|
| Example 1 | 99.8 | 99.5 | 99.2 | 98.6 | 98.1 | 97.7 |
| Example 2 | 99.5 | 98.7 | 98.1 | 97.3 | 96.8 | 96.2 |
| Comparative Example 1 | 99.4 | 98.4 | 97.2 | 95.8 | 94.3 | 93.6 |
| Comparative Example 2 | 99.5 | 98.5 | 97.4 | 96.1 | 93.9 | 92.7 |
| Comparative Example 3 | 99.5 | 98.4 | 97.8 | 96.5 | 93.8 | 90.8 |
| Comparative Example 4 | 99.6 | 98.8 | 97.5 | 96.7 | 94.5 | 93.2 |
| Comparative Example 5 | 99.4 | 98.4 | 98.0 | 95.9 | 94.8 | 91.5 |
| Comparative Example 6 | 99.1 | 98.5 | 97.7 | 95.3 | 91.0 | 85.8 |
| Comparative Example 7 | 99.5 | 98.6 | 97.5 | 96.4 | 95.6 | 94.1 |
| Comparative Example 8 | 99.7 | 99.3 | 98.8 | 98.3 | 97.9 | 97.6 |
| Comparative Example 9 | 99.6 | 99.2 | 98.5 | 98.0 | 97.5 | 97.2 |
| Comparative Example 10 | 99.8 | 99.2 | 99.0 | 98.4 | 98.0 | 97.8 |
| Comparative Example 11 | 98.6 | 97.1 | 95.5 | 94.6 | 94.0 | 93.6 |
| Comparative Example 12 | 98.8 | 97.4 | 96.5 | 95.6 | 94.8 | 94.3 |

Referring to Table 1 to Table 5, it was confirmed that positive electrode active materials of Examples 1 and 2 according to the present invention had the thickness of MO slab of 2.1270 Å and 2.1262 Å, the thickness of inter slab of 2.6051 Å and 2.6054 Å, and the mixing ratio of Li and Ni of 0.30% and 0.36% respectively according to a crystal structure analysis by a Rietveld method when using space group R-3m in a crystal structure model on the basis of an X-ray diffraction analysis. It was also confirmed that coin half-cells prepared by using the positive electrode active materials of Examples 1 and 2 had a high charging capacity and discharging capacity, and the charging-discharging efficiency and life cycle characteristic thereof were also excellent.

On the other hand, in the case of a coin half-cell prepared by using the positive electrode active material of Comparative 1, since the Mo slab of positive electrode active material was greater than 2.1275 Å, it was confirmed that the charging capacity, discharging capacity, and charging-discharging efficiency thereof were at the same level as those of coin half-cells prepared by the positive electrode active materials of Examples 1 and 2, but the life cycle characteristic thereof was lower.

In the cases of coin half-cells prepared by using the positive electrode active materials of Comparative Examples 2, 3, 6, and 7, since the Mo slab of positive electrode active materials were greater than 2.1275 Å and the cation mixing ratios were greater than 0.5%, it was confirmed that the capacity and life cycle characteristics thereof were lower than those of coin half-cells prepared by using the positive electrode active materials of Examples 1 and 2.

In the cases of coin half-cells prepared by using the positive electrode active materials of Comparative Example 4 and Comparative Example 5, since the Mo slab of positive electrode active materials were greater than 2.1275 Å, it was confirmed that the capacity and life cycle characteristics thereof were lower than those of coin half-cells prepared by using the positive electrode active materials of Examples 1 and 2.

In the cases of coin half-cells prepared by using the positive electrode active materials of Comparative Example 8 and Comparative Example 9, since the charging/discharging capacities thereof were smaller and the charging/discharging efficiency thereof was lower than those of coin half-cells prepared by using the positive electrode active materials of Examples 1 and 2, it could be known that the battery performance thereof was deteriorated.

In the case of a coin half-cell prepared by using the positive electrode active material of Comparative Example 10, since the charging/discharging capacities thereof were smaller than those of coin half-cells prepared by using the positive electrode active materials of Examples 1 and 2, it could be known that the battery performance thereof was deteriorated.

In the case of a coin half-cell prepared by using the positive electrode active material of Comparative Example 12, since the composition of positive electrode active material, the Mo slab, the cation mixing ratio did not satisfy the ranges of Claim 1, it was confirmed that the capacity and life cycle characteristics thereof were lower than those of coin half-cells prepared by using the positive electrode active materials of Examples 1 and 2.

The invention claimed is:

1. A lithium secondary battery comprising a positive electrode, a negative electrode, a separator interposed between the positive electrode and the negative electrode, and an electrolyte,
   wherein the positive electrode active material for a lithium secondary battery, the positive electrode active material consists of a compound represented by Formula 1 below and allowing reversible intercalation/deintercalation of lithium,
   wherein from a crystal structure analysis of the positive electrode active material by a Rietveld method in which space group R-3m is used in a crystal structure model on the basis of an Xray diffraction analysis, a thickness of an MO slab is 2.1262 Å to 1270 Å, a thickness of an inter slab is 6051 Å to 6054 Å, and a cation mixing ratio between Li and Ni is from 0.30% to 0.36%, wherein the cation mixing of Li and Ni refers to an amount of Ni cations present in a lithium layer, $$Li_x[Ni_{a1}Co_{b1}Mn_{c1}]O_2 \quad \text{[Formula 1]}$$

in Formula 1 above, $1.0 \leq x \leq 1.04$, a1=0.88, b1=0.08, c1=0.04, and a1+b1+c1=1, wherein a charging capacity of the lithium secondary battery is from 237.0 mAh/g to 237.2 mAh/g.

2. The lithium secondary battery of claim 1, wherein a ratio of
inter slab/MO slab, which is the ratio between the thickness of the MO slab and the inter slab, is 1.2248 to 1.2253.

3. The lithium secondary battery of claim 1, wherein a ratio of a c-axis to an a-axis (c/a) of the positive electrode active material is 9406 to 4.9413.

4. The lithium secondary battery of claim 1, wherein an I(003/104) of the positive electrode active material is 2.0662 to 2.1242.

5. The lithium secondary battery of claim 1, wherein an I(006+102)/(101) of the positive electrode active material is 0.7652 to 0.7720.

6. The lithium secondary battery of claim 1, wherein a Z of the positive electrode active material is 0.24156 to 0.24158.

* * * * *